(No Model.)
R. F. COCHRAN.
COTTON CHOPPER.
No. 323,497. Patented Aug. 4, 1885.
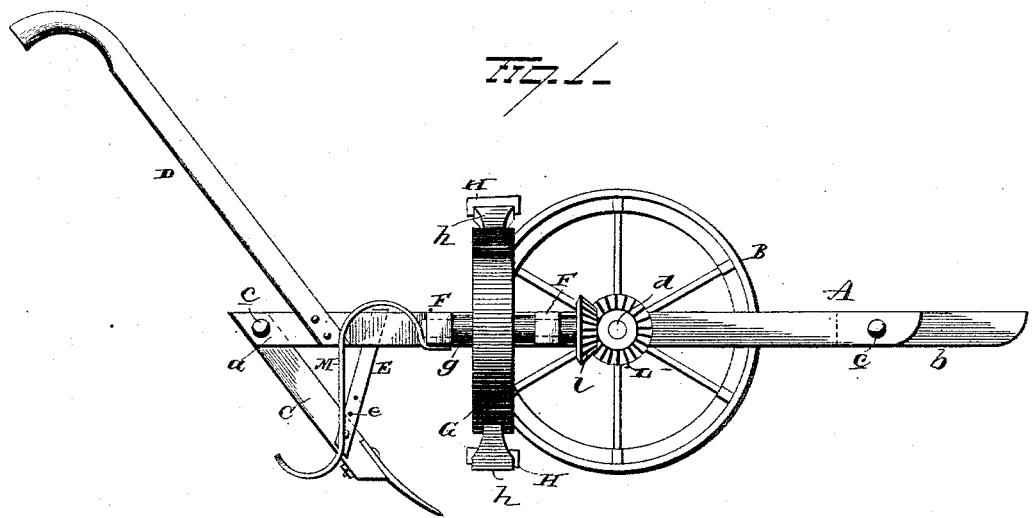
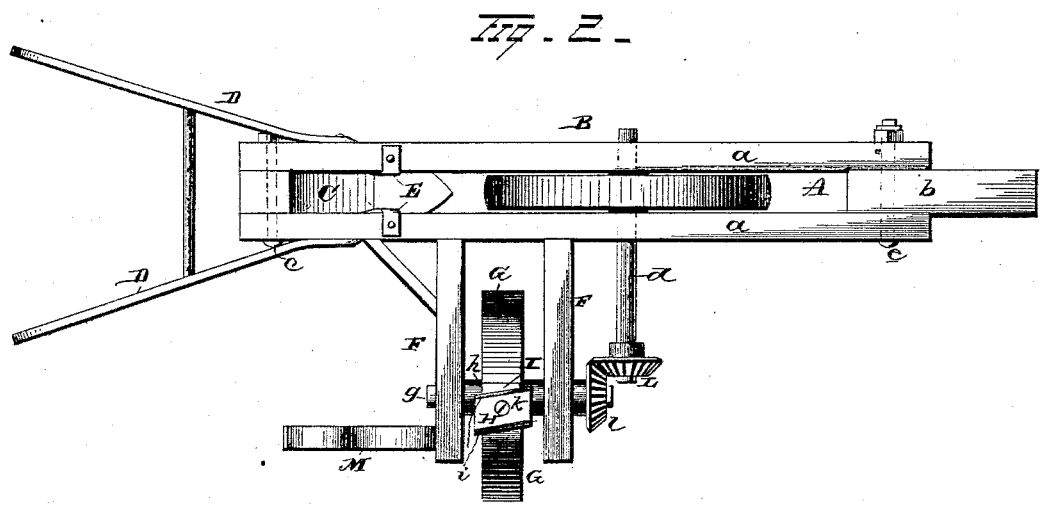
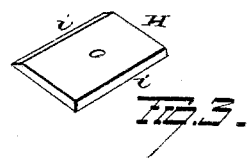
WITNESSES
Geo. F. Downing
S. G. Nottingham
INVENTOR
R. F. Cochran
By Leggett & Leggett
Attorney

UNITED STATES PATENT OFFICE.

RUFUS F. COCHRAN, OF CHIVERSVILLE, GEORGIA.

COTTON-CHOPPER.

SPECIFICATION forming part of Letters Patent No. 323,497, dated August 4, 1885.

Application filed May 6, 1885. (No model.)

*To all whom it may concern:*

Be it known that I, RUFUS F. COCHRAN, of Chiversville, in the county of Washington and State of Georgia, have invented certain new and useful Improvements in Cotton-Choppers; and I do hereby declare the following to be a full, clear, and exact description of the invention, such as will enable others skilled in the art to which it appertains to make and use the same.

My invention relates to an improvement in cotton-choppers.

The object is to provide a machine of simple construction and of an inexpensive character by means of which the weeds between the rows may be cut and the soil loosened at the same time with the spacing or thinning of the young cotton in the row. A further object is to locate the drag for the most part in a direct line with the draft, and to provide a yielding bearing for the spacing-wheel, whereby its knives will automatically lift out of the way of roots or other obstructions; a further object being to provide the spacing-wheel with knives which may be reversed when worn, thereby prolonging the life and reducing the expense of the spacer.

With these ends in view my invention consists in certain features of construction and combinations of parts, as will be hereinafter described, and pointed out in the claims.

In the accompanying drawings, Figure 1 is a view of the machine in elevation. Fig. 2 is a plan view, and Fig. 3 is a detached view of one of the spacer-knives.

A is the plow-beam. It consists, preferably, of two longitudinal beam-sections, *a*, held apart the thickness of the drive-wheel B by a block, *b*, at the front end, and by the upper end of the plow-standard C at the rear end, and firmly united by draw-bolts *c*, passing laterally through the beam-sections and the pieces which separate them. A pair of plow-handles, D, of the ordinary form is secured to the rear ends of the beam-sections *a*.

The plow-beam A is supported upon the drive-wheel B, located between the beam-sections *a* and secured on a shaft, *d*, journaled in suitable bearings attached to the said beam-sections. The plow-standard C is located directly in the rear of the wheel B, and is held firmly in position by means of the braces E, connecting it with the beam-sections *a*. By loosening the draw-bolt *c* the plow-standard may be swung forwardly on the bolt, and the braces E are provided with a series of perforations, *e*, or other suitable means for rendering them adjustable with reference to the standard, so that when it is desirable not to use the plow the lower ends of the braces may be detached and its standard may be swung forward and the plow held in an elevated position by the attachment of the braces thereto. The lower end of the standard is shaped to receive a plow or scraper of the desired form, or it may be shaped to receive plows or scraper-blades of different styles suited to the different grades of work to be done. The construction of the wheel B is not material, provided only that it shall be as light, strong, and durable as is consistent with a moderate cost. I find it convenient to provide it with a rounded face, as shown, which renders it easier to guide. On one side of the beam A, preferably on the right-hand side, and a short distance to the rear of the shaft *d*, is a pair of laterally-extending arms, F, firmly secured to the beam, and one or both braced by diagonal braces *f*. A spacing-wheel, G, is secured between the arms F on a shaft, *g*, journaled in suitable bearings in the arms. The spacing-wheel G is located at such a distance from the beam A that its center will be over a row when the beam A is at the proper siding distance from the row. The wheel G is preferably constructed of metal, and of the rim-and-spoke form; but it may be constructed of wood in the form of a disk or of the rim-and-spoke form. It is desirable, however, that it should have such weight as to make it effective in giving force to the knives, and at the same time be as cheap as is consistent with strength and durability. The face of the wheel G is provided with one or more oblique knives, H, removably secured thereto. For securing the knives, the face of the wheel is conveniently provided with projections *h*, extending outwardly therefrom a distance equal to the deepest cut which the knives will be required to make plus the height of the young cotton, and the outer ends of the projections *h* are either flat and provided with a threaded perforation to receive the knife-retaining screw or they may be provided with a shoulder, as shown at I, to form a shield and additional support for the non-cutting edge of the knife. The knife H is preferably constructed with double cutting-edges $i$, which admits of the knife being reversed whenever the edge becomes dulled, the one perforation in the knife registering with the perforation in the projection $h$ whichever edge be set to the front. A screw, K, is employed to secure the knife to the wheel. The shaft $d$ of the drive-wheel is extended laterally to a point opposite the shaft $g$, and is there provided with a bevel-gear, L, which meshes with a similar gear, $l$, secured on the end of the shaft $g$, and serves to transmit the motion of the drive-wheel B to the spacing-wheel G.

It is desirable that the knives H should be normally held out of contact with the ground, for the purposes of passing from one row to another or shifting from one field to another, and for preventing the knives from striking any obstruction which might injure them. To accomplish this I provide a flat spring standard, M, which is secured at its upper end to the rear arm, F, and extends from thence to the ground in S-shaped form. Its tension is such that when the machine is free from any outside pressure it will hold the knives H above the ground; but when the operator presses on the right-hand handle of the plow the spring-standard M will yield and allow the knives H to enter the ground. The depth to which they will enter will depend entirely upon the amount of pressure exerted, and the moment the pressure is removed the tension of the spring-standard will automatically elevate the knives out of the way of any obstruction under the surface of the ground. The whiffletree is attached to the block $b$. The drive-wheel B and the plow at the rear are in the direct line of draft, thus affording a light draft and enabling the operator to guide the machine with precision.

It is evident that many changes might be resorted to in the construction and arrangement of the several parts without departing from the spirit and scope of my invention. For example, the plow-beam might be cast integral, and provided with a slot to receive the drive-wheel B; or it might consist of a single beam provided with a bracket firmly secured to one side, forming a slot or loop to receive the wheel B, and instead of the yielding spring-standard M a yielding bearing wheel or roller might be secured to a brace extending from the front arm, F, to the forward portion of the beam, and the shaft $d$ might be extended and have a third bearing in such a brace. The plow-standard might also be made vertically adjustable by means of an elongated slot to receive the draw-bolt $c$, in connection with the adjustable braces. Hence I do not wish to limit myself strictly to the construction herein set forth; but, Having fully described my invention, what I claim as new, and desire to secure by Letters Patent, is—

1. In a cotton-chopper, the combination, with a drive-wheel journaled in a beam, of a frame projecting at right angles from said beam, and a spacer-wheel journaled in said frame, substantially as set forth.

2. In a cotton-chopper, the combination, with a beam, a drive-wheel journaled in bearings therein, and a plow located directly behind the drive-wheel, of a frame projecting laterally from one side of the beam, and a spacer-wheel journaled in said laterally-projecting frame.

3. In a cotton-chopper, the combination, with a two-section beam, of a drive-wheel and plow-standard secured to the beam between the sections, substantially as set forth.

4. In a cotton-chopper, the combination, with the plow-beam and drive-wheel, of a spacer-wheel supported in yielding adjustment over the row by a curved spring secured to its frame, and having a bearing on the ground, substantially as set forth.

5. The combination, with a beam, a drive-wheel, a laterally-projecting frame, and a spacer-wheel journaled in said frame, of double-edge reversible knives, secured to the periphery of said spacer-wheel, substantially as set forth.

6. In a cotton-chopper, the combination, with a spacer-wheel provided with one or more shouldered projections on its face, of reversible knives seated on the projections and bearing against the shoulders, substantially as set forth.

In testimony whereof I have signed this specification in the presence of two subscribing witnesses.

RUFUS F. COCHRAN.

Witnesses:
GEO. F. DOWNING,
S. G. NOTTINGHAM.